United States Patent
Kageyama (10) Patent No.: US 7,862,060 B2
(45) Date of Patent: Jan. 4, 2011

(54) FRONT SUSPENSION APPARATUS FOR VEHICLE

(75) Inventor: Yusuke Kageyama, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 192 days.

(21) Appl. No.: 12/176,860

(22) Filed: Jul. 21, 2008

(65) Prior Publication Data

US 2009/0230651 A1 Sep. 17, 2009

(30) Foreign Application Priority Data

Jul. 26, 2007 (JP) .............................. 2007-194970

(51) Int. Cl.
*B60G 3/04* (2006.01)
(52) U.S. Cl. .............................................. 280/124.134
(58) Field of Classification Search .......... 280/124.134, 280/124.135, 124.136, 124.138, 124.139, 280/124.14, 124.141
See application file for complete search history.

(56) References Cited

U.S. PATENT DOCUMENTS

| | | | | |
|---|---|---|---|---|
| 4,245,853 A | * | 1/1981 | Inoue et al. ............ | 280/124.143 |
| 4,941,677 A | | 7/1990 | Matsumoto et al. | |
| 5,499,839 A | * | 3/1996 | Wahl et al. ............ | 280/124.145 |
| 5,507,510 A | * | 4/1996 | Kami et al. ............ | 280/124.136 |
| 2006/0033301 A1 | | 2/2006 | Roos et al. | |

FOREIGN PATENT DOCUMENTS

| | | |
|---|---|---|
| DE | 42 42 708 C1 | 4/1994 |
| DE | 44 08 571 A1 | 9/1994 |
| EP | 0 441 228 A1 | 8/1991 |
| EP | 0503371 A1 | 9/1992 |
| FR | 2 426 585 | 12/1979 |
| JP | 60064006 A * | 4/1985 |
| JP | 2003-136927 A | 5/2003 |
| WO | WO 2004/076262 A1 | 9/2004 |
| WO | WO 2004/094169 A1 | 11/2004 |

\* cited by examiner

*Primary Examiner*—Faye M. Fleming
(74) *Attorney, Agent, or Firm*—Foley & Lardner LLP

(57) ABSTRACT

A front suspension apparatus includes a plurality of links suspending an axle member. First and second lower link members are arranged to dispose the second lower link member at a more rearward position than the first lower link member, to cause an imaginary line connecting both attaching points of the second lower link member to have a smaller angle than that of an imaginary line connecting both attaching points of the first lower link member relative to a line extending right in the vehicle-width direction as viewed from above of the vehicle, to cause the imaginary line of the second lower link member to overlap with a shaft portion of the axle member as viewed from the above, to locate the axle-member-side attaching point of the second lower link member at a more downward position than the axle-member-side attaching point of the first lower link member, and to locate the axle-member-side attaching point of the first lower link member more inwardly in the vehicle-width direction than the axle-member-side attaching point of the second lower link member.

8 Claims, 5 Drawing Sheets

FRONT SUSPENSION APPARATUS FOR VEHICLE

BACKGROUND OF THE INVENTION

The present invention relates to a front suspension apparatus adapted to suspend or support a front wheel provided as a steering road wheel, so as to enable the front wheel to move (have a suspension stroke) in the vertical direction relative to a vehicle body.

As a front suspension apparatus for a vehicle, Japanese Patent Application Publication No. 2003-136927 discloses a previously proposed double-pivot type front suspension apparatus. Since this front suspension apparatus is of double-pivot type in which two lower link members suspend an axle member from the vehicle body, an imaginary pivot point is set on a point at which extension lines of both lower link members intersect with each other. By adjusting a relationship of relative positions between the two lower link members, the position of the imaginary pivot point can be freely set so that a degree of freedom to set a kingpin axis can be enhanced.

The double-pivot type front suspension apparatus disclosed in the above patent application can adjust a lateral-force compliance steer amount by means of a fluctuating (swinging) direction and a fluctuating amount of two lower link members. Hence, a bush stiffness at each of vehicle-body-side attaching points and axle-member-side attaching points of these lower link members can be determined only by a requirement of lateral stiffness. Therefore, two performances of the "adjustment of lateral-force compliance steer amount" and the "enhancement of lateral stiffness" can be achieved at high order. Thus, with respect to these both characteristics, "degree of freedom to allocate static characteristics" is increased in this technique.

In the case of a suspension apparatus using an A-shaped arm member instead of the two lower link members, the lateral stiffness and the lateral-force compliance steer amount can be adjusted only by the bush stiffness at each of vehicle-body-side attaching points and an axle-member-side attaching point of the A-shaped arm member. Accordingly, when trying to enlarge the lateral stiffness by enhancing the bush stiffness, the lateral-force compliance steer amount becomes too small. On the other hand, when trying to enlarge the lateral-force compliance steer amount by reducing the bush stiffness, the lateral stiffness becomes insufficient. As just mentioned, two performances of the "adjustment of lateral-force compliance steer amount" and the "enhancement of lateral stiffness" cannot be achieved at high order. Thus, in this case, with respect to these both characteristics, the "degree of freedom to allocate static characteristics" is low, so that a sacrifice of any one of these both characteristics cannot be avoided.

Contrary to the above case, in the double-pivot type front suspension apparatus as disclosed in the above patent application, the lateral-force compliance steer amount can be adjusted by the fluctuating direction and fluctuating amount of the two lower link members, alone, as mentioned above. Then, the lateral stiffness can be set by the bush stiffness at each of vehicle-body-side attaching points and axle-member-side attaching points of the lower link members, alone, as mentioned above. Namely, the "degree of freedom to allocate static characteristics" is high with respect to these both characteristics, so that the above-mentioned problem can be avoided.

Therefore, the double-pivot type front suspension apparatus has the above-mentioned advantage related to the high degree of freedom to set the kingpin axis, and the advantage that the "degree of freedom to allocate static characteristics" is high with regard to the "adjustment of lateral-force compliance steer amount" and the "enhancement of lateral stiffness".

SUMMARY OF THE INVENTION

However, in the case of the double-pivot type front suspension apparatus as disclosed in the above patent application, there has been the following tendency. That is, the two lower link members are displaced at the time of a turning (a changing of steering angle) of front wheels so that the imaginary pivot point set at the intersection of extension lines of both lower link members is displaced also in a front-rear direction of the vehicle. Thereby, the imaginary pivot point does not have a fixed point relative to the front-rear direction, and an inclination of the kingpin axis based on the imaginary pivot point is varied. Therefore, a caster angle which forms a "wheel alignment" influencing a handling (steering) characteristic is varied during the turning of front wheels, so that the handling (steering) characteristic of the vehicle is varied during the turning of front wheels.

It is therefore an object of the present invention to provide a front suspension apparatus for a vehicle, that has a suspension geometry devised to efficiently suppress the movement of the imaginary pivot point in the front-rear direction of vehicle at the time of turning of the front wheels, and devised to maintain the high degree of freedom to set the kingpin axis and the high degree of freedom to allocate the static characteristics.

According to one aspect of the present invention, there is provided a front suspension apparatus for a vehicle, comprising: a plurality of links suspending an axle member from a vehicle body to allow the axle member to move in a vertical direction of the vehicle, the axle member including a shaft portion rotatably supporting a front wheel, the plurality of links extending inwardly in a vehicle-width direction from the axle member, the plurality of links including an upper arm member extending from a position above the shaft portion of the axle member to the vehicle body, and first and second lower link members each extending from a position below the shaft portion of the axle member to the vehicle body, the first and second lower link members being arranged to dispose the second lower link member at a more rearward position than the first lower link member, to cause an imaginary straight line connecting a vehicle-body-side attaching point of the second lower link member with an axle-member-side attaching point of the second lower link member to have a smaller angle than that of an imaginary straight line connecting a vehicle-body-side attaching point of the first lower link member with an axle-member-side attaching point of the first lower link member relative to an imaginary straight line extending right in the vehicle-width direction, as viewed from above of the vehicle, to cause the imaginary straight line of the second lower link member to overlap with the shaft portion of the axle member, as viewed from above of the vehicle, to locate the axle-member-side attaching point of the second lower link member more downwardly than the axle-member-side attaching point of the first lower link member, and to locate the axle-member-side attaching point of the first lower link member more inwardly in the vehicle-width direction than the axle-member-side attaching point of the second lower link member.

According to another aspect of the present invention, there is provided a front suspension apparatus for a vehicle, comprising: means for suspending an axle member from a vehicle body to allow the axle member to move in a vertical direction of the vehicle, the axle member including a shaft portion rotatably supporting a front wheel, the means extending inwardly in a vehicle-width direction from the axle member, the means including upper link means extending from a position above the shaft portion of the axle member to the vehicle body, and first and second lower link means each extending from a position below the shaft portion of the axle member to the vehicle body, the first and second lower link means being arranged to dispose the second lower link means at a more rearward position than the first lower link means, to cause an imaginary straight line connecting a vehicle-body-side attaching point of the second lower link means with an axle-member-side attaching point of the second lower link means to have a smaller angle than that of an imaginary straight line connecting a vehicle-body-side attaching point of the first lower link means with an axle-member-side attaching point of the first lower link means relative to an imaginary straight line extending right in the vehicle-width direction, as viewed from above of the vehicle, to cause the imaginary straight line of the second lower link means to overlap with the shaft portion of the axle member, as viewed from above of the vehicle, to locate the axle-member-side attaching point of the second lower link means more downwardly than the axle-member-side attaching point of the first lower link means, and to locate the axle-member-side attaching point of the first lower link means more inwardly in the vehicle-width direction than the axle-member-side attaching point of the second lower link means.

The other objects and features of this invention will become understood from the following description with reference to the accompanying drawings.

DETAILED DESCRIPTION OF THE INVENTION

Figure 1:
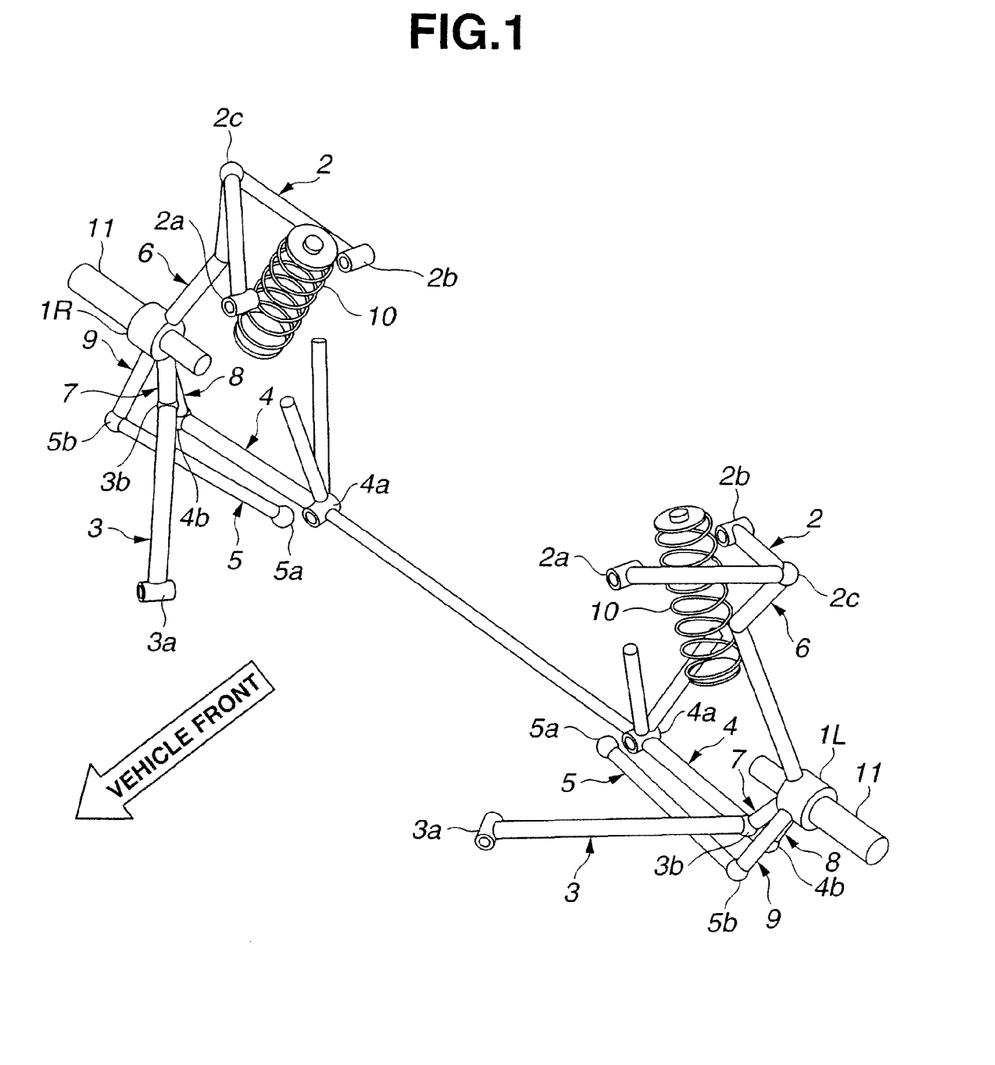
FIG. 1 is an entire oblique perspective view showing a front suspension apparatus for a vehicle according to an embodiment of the present invention, as viewed from an area above a left-front wheel.

Hereinafter, embodiments according to the present invention will be explained in detail with reference to the drawings. FIG. 1 shows the whole of a front suspension apparatus for a vehicle according to an embodiment of the present invention. A sign 1L designates an axle member for a left-front wheel, and a sign 1R designates an axle member for a right-front wheel. Each of axle members 1L and 1R includes a shaft portion 11 rotatably supporting the corresponding left or right front wheel, at a center of the each of axle members 1L and 1R. The shaft portion 11 (axle member 1L or 1R) is suspended from a vehicle body (not shown) to be movable in a vertical direction of the vehicle (i.e., to enable a suspension stroke), by means of a plurality of links extending from axle member 1L or 1R inwardly in a width direction (lateral wide direction) of the vehicle.

The detailed explanations about the plurality of links and a suspending structure for axle members 1L and 1R by use of the plurality of links are described below. The plurality of links on each of left and right sides include an upper arm member 2, and three of a first lower link member 3, a second lower link member 4 and a third lower link member 5. Upper arm member 2 extends between the vehicle body and an area higher than the above-mentioned front-wheel-supporting shaft portion 11 of axle member 1L or 1R. Each of the three of first lower link member 3, second lower link member 4 and third lower link member 5 extends between the vehicle body and an area lower than the front-wheel-supporting shaft portion 11 of axle member 1L or 1R. Third lower link member 5 serves for a turning (steering) of the front wheel.

Upper arm member 2 is formed in an A-shape (A-shaped arm), to include a tip 2c and two-forked (bifurcated) base ends 2a and 2b. Upper arm member 2 is disposed so as to arrange two-forked base ends 2a and 2b to face each other in a front-rear direction of the vehicle and so as to arrange tip 2c to be directed outwardly in the vehicle-width direction. Respective two-forked base ends 2a and 2b of upper arm member 2 are attached swingably to the vehicle body through elastic bushes, to enable upper arm member 2 to swing in the vertical direction. Thus, two-forked base ends 2a and 2b provide a vehicle-body-side attaching point(s) of upper arm member 2. Tip 2c of upper arm member 2 is connected or articulated with an upper end of a bent rod 6 through a joint. Bent rod 6 is provided to extend upwardly from axle member 1L or 1R. Thus, the connecting point between tip 2c of upper arm member 2 and the upper end of bent rod 6 provides an axle-member-side attaching point of upper arm member 2.

First lower link member 3 is extended inwardly in the vehicle-width direction from axle member 1L or 1R, as mentioned above. Simultaneously, first lower link member 3 is extended also to be directed in a front direction of the vehicle. A tip (end) 3a of first lower link member 3 which is located in the extending direction is attached swingably to the vehicle body through an elastic bush, to enable first lower link member 3 to swing in the vertical direction. Thus, tip 3a provides a vehicle-body-side attaching point of first lower link member 3. Another end portion 3b of first lower link member 3 which is located on the opposite side (in a direction toward axle member 1L or 1R) is connected or articulated with a tip (end) of a rod 7 through a joint. This rod 7 is provided to extend downwardly from axle member 1L or 1R. Thus, the connecting point between end portion 3b of first lower link member 3 and the tip of rod 7 provides an axle-member-side attaching point of first lower link member 3.

Second lower link member 4 is disposed in a more rearward position than first lower link member 3. This second lower link member 4 extends inwardly in the vehicle-width direction from axle member 1L or 1R, as mentioned above. A tip (end) 4a of second lower link member 4 which is located in the extending direction is attached swingably to the vehicle body through an elastic bush, to enable second lower link member 4 to swing in the vertical direction. Thus, tip 4a provides a vehicle-body-side attaching point of second lower link member 4. Another end portion 4b of second lower link member 4 which is located on the opposite side (in a direction toward axle member 1L or 1R) is connected or articulated with a tip of a rod 8 through a joint. This rod 8 is provided to extend downwardly from axle member 1L or 1R. Thus, the connecting point between end portion 4b of second lower link member 4 and the tip of rod 8 provides an axle-member-side attaching point of second lower link member 4.

Third lower link member 5 for steering the front wheel extends inwardly in the vehicle-width direction from axle member 1L or 1R, as mentioned above. A tip (end) 5a of third lower link member 5 which is located in the extending direction is connected or articulated through a joint with a steering member such as a rack. Third lower link member 5 is attached through this steering member to the vehicle body, to be capable of swinging in the vertical direction. Thus, tip 5a of third lower link member 5 provides a vehicle-body-side attaching point of third lower link member 5. Another end portion 5b of third lower link member 5 which is located on the opposite side (in a direction toward axle member 1L or 1R) is connected or articulated with a tip of a rod 9 through a joint. This rod 9 is provided to extend in the frontward direction and the downward direction from axle member 1L or 1R. Thus, the connecting point between end portion 5b of third lower link member 5 and the tip of rod 9 provides an axle-member-side attaching point of third lower link member 5.

By means of the above-mentioned suspension link structure, axle members 1L and 1R are suspended or mounted to be capable of moving along its stroke in the vertical direction of vehicle together with the left and right front wheels rotatably supported by these axle members 1L and 1R. A suspension spring 10 for elastically supporting axle member 1L or 1R (left or right wheel) to the vehicle body in this stroke direction is provided so as to hang between the vehicle body and the suspension link structure.

Figure 3:
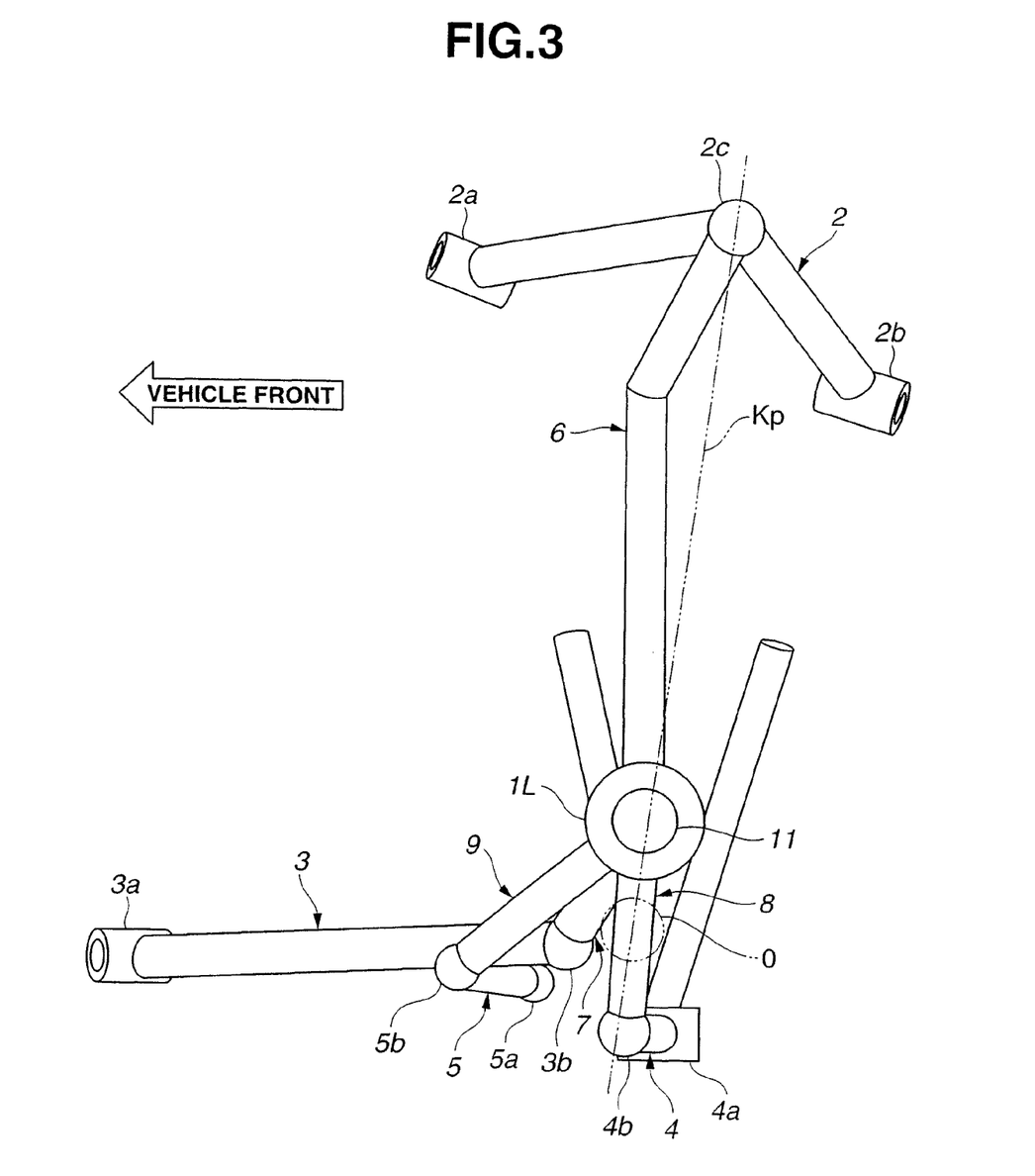
FIG. 3 is a side view showing the front suspension apparatus, as viewed from a left side area of the vehicle.
Figure 4:
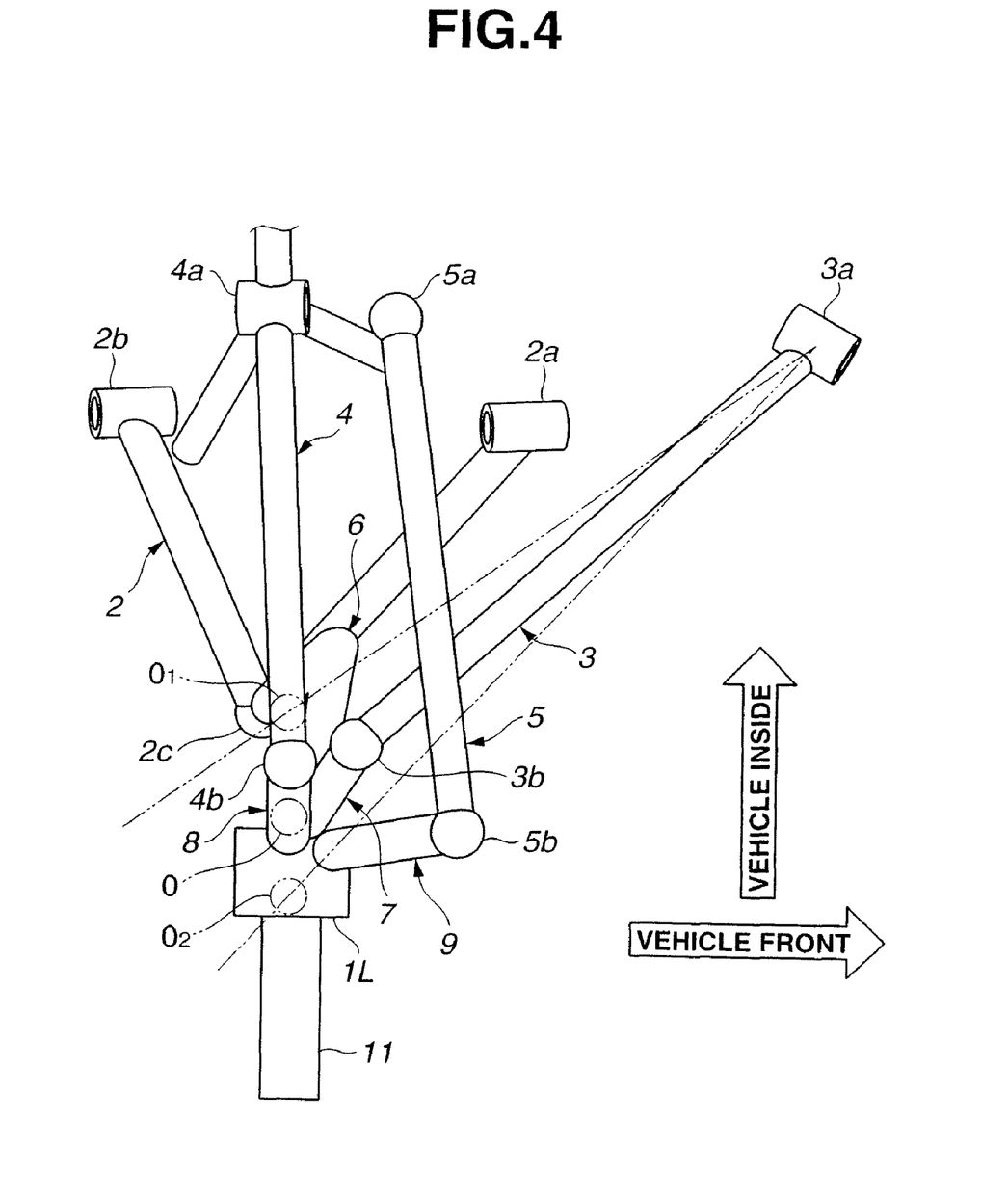
FIG. 4 is a bottom view showing the part of the front suspension apparatus related to the left-front wheel, as viewed from an area below the vehicle.

In this embodiment, first lower link member 3 extends from axle member 1L or 1R in the frontward direction and inwardly in the vehicle-width direction, as mentioned above. Specifically, vehicle-body-side attaching point 3a of first lower link member 3 is placed in a more frontward position than vehicle-body-side attaching points 4a and 5a of second and third lower link members 4 and 5, also as shown in FIGS. 3 and 4. Moreover, first lower link member 3 and second lower link member 4 are arranged in such a manner that a straight line passing through vehicle-body-side attaching point 4a and axle-member-side attaching point 4b of second lower link member 4 has a smaller angle relative to a straight line extending rightly in the vehicle-width direction than that of a straight line passing through vehicle-body-side attaching point 3a and axle-member-side attaching point 3b of first lower link member 3, when viewed from an above of the vehicle (similarly when viewed from a bottom of the vehicle as FIG. 4). That is, the angle between the straight line extending exactly in the vehicle-width direction and the straight line passing through vehicle-body-side attaching point 4a and axle-member-side attaching point 4b is smaller than the angle between the straight line extending exactly in the vehicle-width direction and the straight line passing through vehicle-body-side attaching point 3a and axle-member-side attaching point 3b, when viewed from upper or lower side.

As shown in FIG. 3, vehicle-body-side attaching point 3a of first lower link member 3 is placed at a more downward position than axle-member-side attaching point 3b of first lower link member 3, and is placed at a more upward position than axle-member-side attaching point 4b of second lower link member 4. Moreover as shown in FIGS. 2 and 3, axle-member-side attaching point 4b of second lower link member 4 is placed at a more downward position than axle-member-side attaching point 3b of first lower link member 3.

Figure 2:
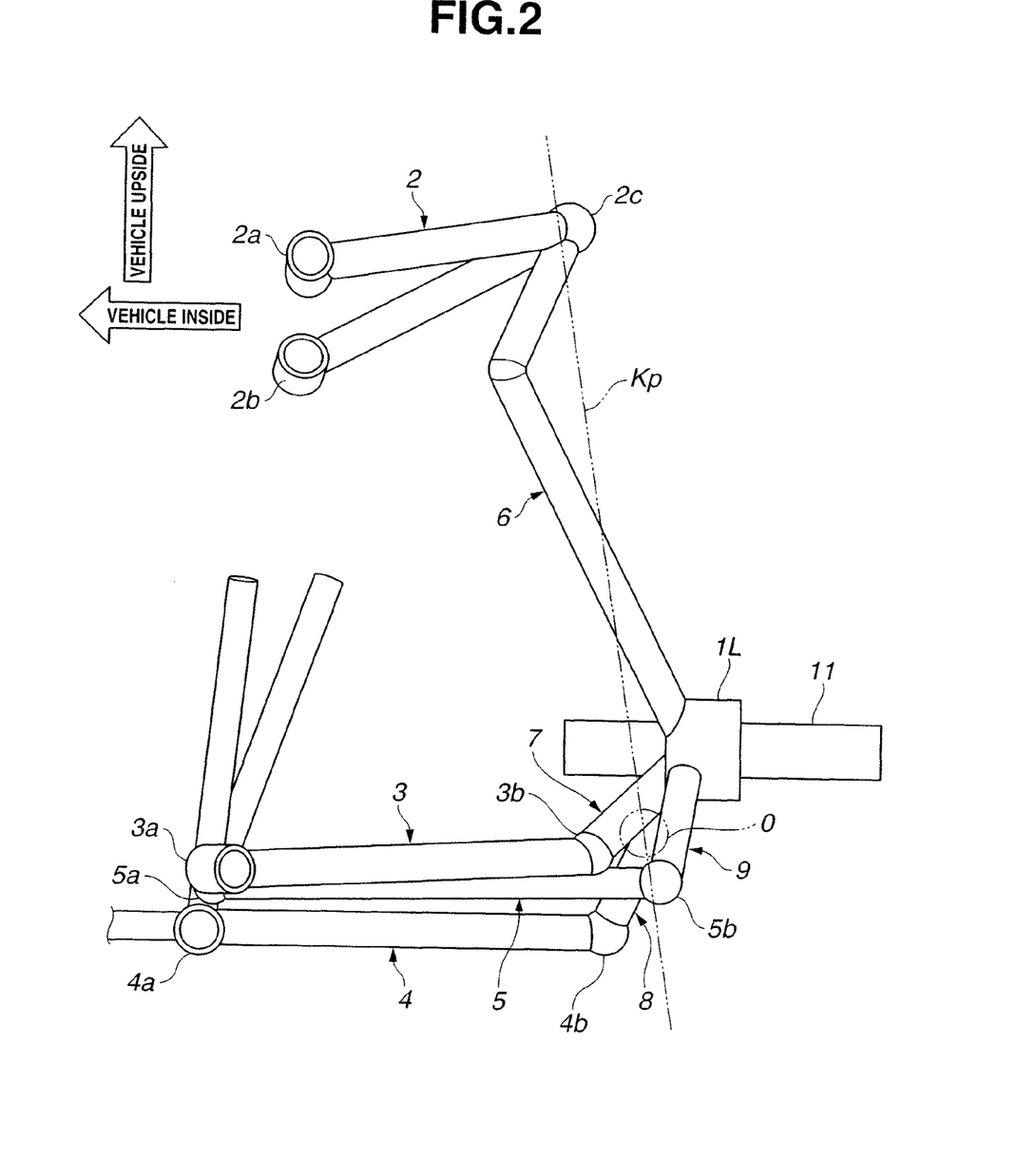
FIG. 2 is a front view showing a part of the front suspension apparatus related to the left-front wheel, as viewed from an area anterior to the vehicle.

As shown in FIG. 2, second lower link member 4 is arranged in such a manner that axle-member-side attaching point 4b is placed in a more upward position than vehicle-body-side attaching point 4a. Moreover in FIGS. 3 and 4, second lower link member 4 is arranged in such a manner that the straight line passing through vehicle-body-side attaching point 4a and axle-member-side attaching point 4b overlaps with the front-wheel-supporting shaft portion 11 of axle member 1L or 1R when viewed from an above of the vehicle (similarly when viewed from a bottom of the vehicle as FIG. 4). As shown in FIGS. 3 and 4, axle-member-side attaching point 2c of upper arm member 2 is placed at a more rearward position than (an axis line of) the front-wheel-supporting shaft portion 11 of axle member 1L or 1R.

As shown in FIGS. 2 and 3, vehicle-body-side attaching point 3a of first lower link member 3 is located between vehicle-body-side attaching point 4a of second lower link member 4 and (the axis line of) the front-wheel-supporting shaft portion 11 of axle member 1L or 1R with respect to the vertical (up-down) direction of vehicle. Moreover, vehicle-body-side attaching point 3a of first lower link member 3 is located at a more frontward position than the axis line of the front-wheel-supporting shaft portion 11. Moreover as shown in FIGS. 3 and 4, vehicle-body-side attaching point 4a and axle-member-side attaching point 4b of second lower link member 4 are placed in the same position as front-wheel-supporting shaft portion 11 of axle member 1L or 1R providing the rotational center of the front wheel, with respect to the front-rear direction of the vehicle.

As shown in FIGS. 3 and 4, axle-member-side attaching point 3b of first lower link member 3 is located near axle-member-side attaching point 4b of second lower link member 4, as compared with the other attaching points.

As shown in FIGS. 3 and 4, axle-member-side attaching point 5b of third lower link member 5 is located in a more frontward position than axle-member-side attaching points 3b and 4b of first and second lower link members 3 and 4. Moreover, as shown in FIG. 2, axle-member-side attaching point 5b of third lower link member 5 is located at a more outward position relative to the vehicle-width direction than axle-member-side attaching points 3b and 4b of first and second lower link members 3 and 4.

When viewed from an above of the vehicle (similarly when viewed from a bottom of the vehicle as FIG. 4), even at the time of turning of the vehicle, an imaginary pivot point O of the lower links which is formed by a line extended from first lower link member 3 (i.e., the straight line passing through vehicle-body-side attaching point 3a and axle-member-side attaching point 3b) and the straight line passing through vehicle-body-side attaching point 4a and axle-member-side attaching point 4b of second lower link member 4 is located on the straight line passing through vehicle-body-side attaching point 4a and axle-member-side attaching point 4b of second lower link member 4 which is given under a straight running of the vehicle as shown in FIG. 4 (also see FIGS. 2 and 3). That is, first lower link member 3 and second lower link member 4 are arranged or designed so as to position the above-mentioned imaginary pivot point O on the straight line connecting vehicle-body-side attaching point 4a with axle-member-side attaching point 4b which is substantially fixed also during the turning of the front wheel, when viewed from upper or lower side.

In detail, as shown in FIG. 4, axle-member-side attaching point 3b is located more inwardly in the vehicle-width direction than axle-member-side attaching point 4b. Hence, a distance (called "first lever length") between axle-member-side attaching point 3b and a turning center of axle member 1L or 1R which is defined at the time of turning of the vehicle (i.e., at the time of changing of steering angle) is greater than a distance (called "second lever length") between axle-member-side attaching point 4b and the turning center of axle member 1L or 1R. Therefore, a displacement amount of axle-member-side attaching point 4b which is caused by the turning of axle member 1L or 1R at the time of turning of the vehicle is smaller than that of axle-member-side attaching point 3b in the front-rear direction of vehicle.

As shown in FIG. 2, two vehicle-body-side attaching points 2a and 2b of upper arm member 2 are located in a more downward position than axle-member-side attaching point 2c of upper arm member 2. Moreover as shown in FIG. 2, upper arm member 2 is arranged in such a manner that vehicle-body-side attaching point 2a which is forward one of vehicle-body-side attaching points 2a and 2b is located at a more upward position than vehicle-body-side attaching point 2b which is rearward one of vehicle-body-side attaching points 2a and 2b.

Imaginary pivot point O of the lower links which is defined by the line extended from first lower link member 3 (i.e., the straight line passing through vehicle-body-side attaching point 3a and axle-member-side attaching point 3b) and the straight line passing through vehicle-body-side attaching point 4a and axle-member-side attaching point 4b of second lower link member 4 is located in a more outward position relative to the vehicle-width direction than axle-member-side attaching point 2c of upper arm member 2 as viewed from a front side of the vehicle. That is, first lower link member 3 and second lower link member 4 are arranged or extended so as to position the above-mentioned imaginary pivot outwardly in the vehicle-width direction beyond axle-member-side attaching point 2c of upper arm member 2 when viewed from the front side.

The front suspension apparatus having the above-mentioned structures according to this embodiment can produce the following effects and advantages. In this embodiment, as mentioned above; second lower link member 4 is disposed in a more rearward position than first lower link member 3; first lower link member 3 and second lower link member 4 are structurally arranged so as to cause the straight line passing through vehicle-body-side attaching point 4a and axle-member-side attaching point 4b of second lower link member 4 to have smaller angle relative to the straight line extending rightly in the vehicle-width direction than the angle of the straight line passing through vehicle-body-side attaching point 3a and axle-member-side attaching point 3b of first lower link member 3 as viewed from an above of the vehicle; axle-member-side attaching point 4b of second lower link member 4 is disposed downwardly beyond axle-member-side attaching point 3b of first lower link member 3; and axle-member-side attaching point 3b of first lower link member 3 is disposed inwardly in the vehicle-width direction beyond axle-member-side attaching point 4b of second lower link member 4. Accordingly, as viewed from an above of the vehicle, imaginary pivot point O is set on the straight line connecting vehicle-body-side attaching point 4a with axle-member-side attaching point 4b.

Moreover, second lower link member 4 is structurally arranged to cause the straight line passing through vehicle-body-side attaching point 4a and axle-member-side attaching point 4b to overlap with front-wheel-supporting shaft portion 11 of axle member 1L or 1R when viewed from an above of the vehicle. Accordingly, even if imaginary pivot point O moves during a turning (a changing of steering angle) of the front wheels, imaginary pivot point O moves along the axis line of front-wheel-supporting shaft portion 11, i.e., moves without a displacement in the vehicle front-rear direction, as shown by signs $O_1$ and $O_2$ in FIG. 4.

Figure 5:
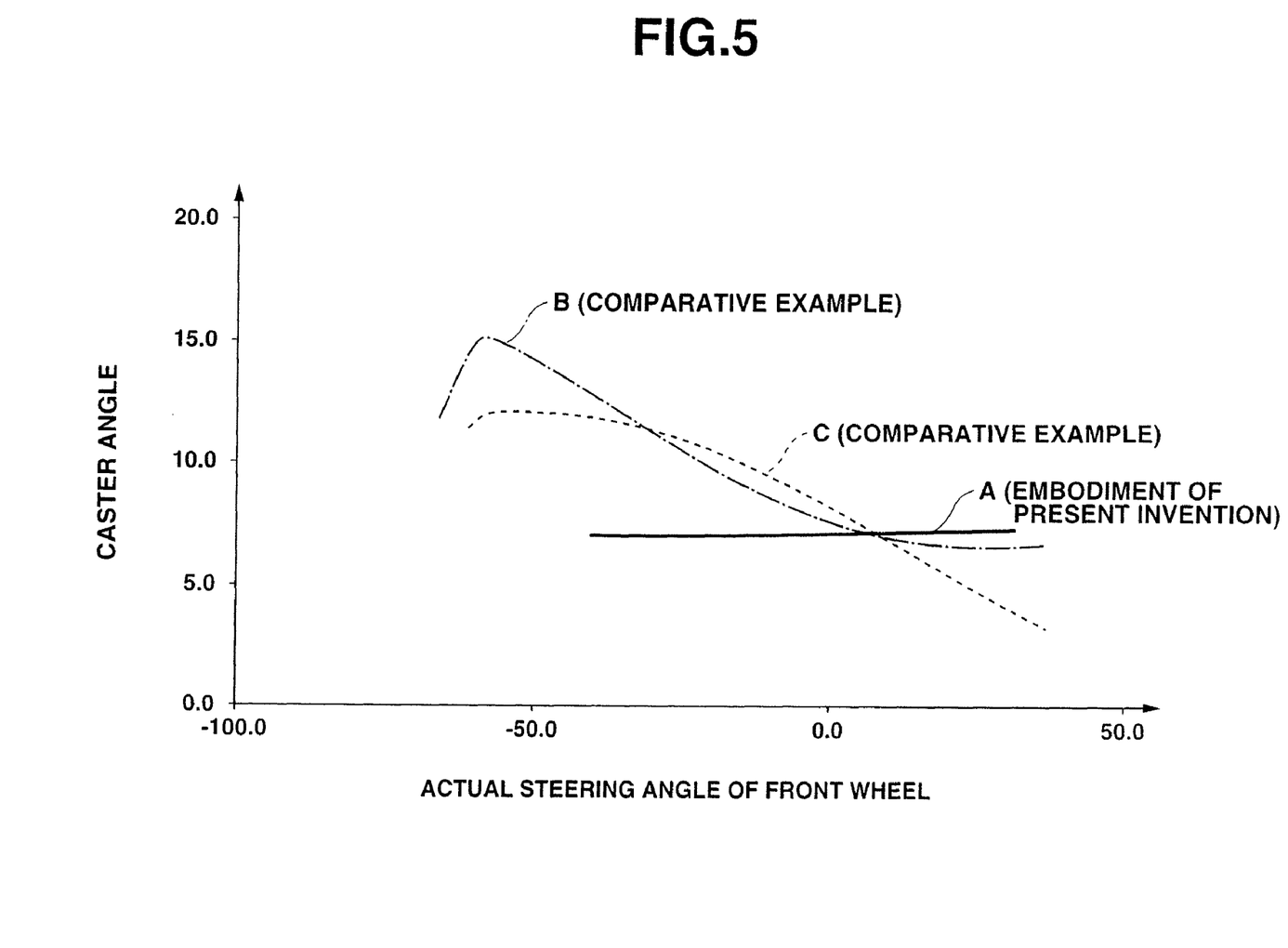
FIG. 5 is a characteristic view showing a variation characteristic of a caster angle relative to an actual steering angle of front wheel in the case of usage of the front suspension apparatus according to the embodiment, as compared with that in the case of usage of a double-pivot-type suspension apparatus in earlier technology.

Thus, the straight line passing through vehicle-body-side attaching point 4a and axle-member-side attaching point 4b on which imaginary pivot point O is set during the turning of front wheels provides a fixed point relative to the vehicle front-rear direction so that imaginary pivot point O does not move at least in the vehicle front-rear direction during the turning of front wheels. Accordingly, at the time of turning of the front wheels, a kingpin axis (line) Kp shown by an alternate long and two short dashes line in FIGS. 2 and 3 does not cause a variation of inclination in the vehicle front-rear direction. Thereby, a caster angle greatly influencing a handling (steering) characteristic almost does not vary in accordance with a variation of actual steering angle of the front wheel, as shown by a solid line A in FIG. 5. Hence, the handling (steering) characteristic of vehicle does not vary during the turning of front wheels. Therefore, the problem of the double-pivot-type front-wheel suspension apparatus in earlier technology as described in "SUMMARY OF THE INVENTION" of the present Description can be resolved.

As the double-pivot-type front-wheel suspension apparatus in earlier technology, there are a tension double-pivot-type front-wheel suspension apparatus and a compression double-pivot-type front-wheel suspension apparatus. A variation characteristic between the actual steering angle of front wheel and the caster angle in the tension double-pivot-type front-wheel suspension apparatus is shown by an alternate long and short dash line B in FIG. 5. In this variation characteristic, the caster angle varies greatly in accordance with the variation of the actual steering angle of front wheel. A variation characteristic between the actual steering angle of front wheel and the caster angle in the compression double-pivot-type front-wheel suspension apparatus is shown by a dotted line C in FIG. 5. In this variation characteristic, the caster angle varies greatly in accordance with the variation of the actual steering angle of front wheel. In both cases in earlier technology, the steering characteristic of vehicle cannot be prohibited from varying during the turning of the front wheels.

In this embodiment, imaginary pivot point O moves in the vehicle-width direction during the turning (changing of steering angle) of front wheels, as shown by signs $O_1$ and $O_2$ in FIG. 4. However, this movement in the vehicle-width direction can be reduced up to a degree causing almost no problem, by properly designing a mounting angle for first lower link member 3.

The above-mentioned suspension geometry in this embodiment can produce the above-mentioned advantages and the solution of the above-described problem, without disturbing features related to the above-described high freedom degree to set the kingpin axis and the high freedom degree to allocate static characteristics in the double-pivot-type front suspension apparatus, namely while maintaining such advantageous features of earlier technology as before.

As mentioned above, second lower link member 4 is arranged in such a manner that the straight line passing through axle-member-side attaching point 4b and vehicle-body-side attaching point 4a of second lower link member 4 overlaps with front-wheel-supporting shaft portion 11 of axle member 1L or 1R as viewed from an above of the vehicle. In this arrangement, it is preferable that second lower link member 4 is arranged in such a manner that the straight line passing through axle-member-side attaching point 4b and vehicle-body-side attaching point 4a of second lower link member 4 overlaps with front-wheel-supporting shaft portion 11 of axle member 1L or 1R relative to the vehicle front-rear direction and also in the vertical direction (i.e., as viewed from an above of the vehicle and also as viewed from a front of the vehicle at the time of straight running of the vehicle), although as is not shown in the drawings. Moreover, it is preferable that second lower link member 4 is arranged in such a manner that the straight line passing through axle-member-side attaching point 4b and vehicle-body-side attaching point 4a of second lower link member 4 is located at the same position as front-wheel-supporting shaft portion 11 of axle member 1L or 1R (the rotational center line of front wheel) relative to the vehicle front-rear direction and also in the vertical direction. In this preferable case, the above-mentioned advantage of causing the caster angle to vary very little by preventing imaginary pivot point O from moving in the front-rear direction at the time of the turning of front wheels can be further enhanced.

Further, in this embodiment, axle-member-side attaching point 3b of first lower link member 3 is placed in proximity to axle-member-side attaching point 4b of second lower link member 4 as mentioned above. Also by virtue of this feature, the above-mentioned advantage of causing the caster angle to vary very little by preventing imaginary pivot point O from moving in the front-rear direction at the time of the turning of front wheels can be further enhanced.

It is noted that such advantage can be also achieved alternatively by a structure (not shown) in which vehicle-body-side attaching point 3a of first lower link member 3 is placed in proximity to vehicle-body-side attaching point 4a of second lower link member 4.

Additional advantages according to this embodiment are now explained below. In this embodiment, vehicle-body-side attaching point 3a of first lower link member 3 is located in a more frontward position than vehicle-body-side attaching points 4a and 5a of second and third lower link members 4 and 5 as shown in FIG. 3, and vehicle-body-side attaching point 3a of first lower link member 3 is located in a more downward position than axle-member-side attaching point 3b of first lower link member 3 as shown in FIGS. 2 and 3. Accordingly, an instantaneous center of rotation (ICR) of axle member 1L or 1R (front wheel) during the suspension stroke caused by a nose dive (i.e., a phenomenon in which a front portion of the vehicle body squats or sinks down) at the time of a braking of the vehicle is made higher because of the above-mentioned arrangement of vehicle-body-side attaching point 3a of first lower link member 3. Thus, an anti-dive angle defined as an angle between a road surface and a line passing through this instantaneous center of rotation of axle member 1L or 1R (front wheel) and a tire ground point of the front wheel is made greater because of the higher arrangement of the instantaneous center of rotation.

The magnitude of this anti-dive angle serves to resist or suppress the nose dive during the braking of vehicle. The front suspension apparatus according to this embodiment which can enlarge the anti-dive angle as mentioned above can achieve the suppression of a pitching behavior when decelerating the vehicle, by efficiently suppressing the nose dive phenomenon caused during the braking of vehicle.

Moreover in this embodiment, while vehicle-body-side attaching point 3a of first lower link member 3 is positioned downwardly beyond axle-member-side attaching point 3b of first lower link member 3 as mentioned above in order to achieve the effect of nose-dive suppression, vehicle-body-side attaching point 3a of first lower link member 3 is positioned upwardly beyond axle-member-side attaching point 4b of second lower link member 4 as shown in FIG. 3. Accordingly, when the front wheel runs on a projection of road surface, a locus (trail) of ground point of axle member 1L or 1R (front wheel) which is caused by the suspension stroke is accompanied with a displacement in the rear direction of vehicle. Such rearward inclination (displacement) of this locus of ground point reduces a vibration caused when running on the projection, so that an improvement of ridding comfort can be achieved.

Here, in the case where vehicle-body-side attaching point 3a of first lower link member 3 is positioned upwardly beyond axle-member-side attaching point 4b of second lower link member 4 as mentioned above in order to produce the rearward inclination of the locus of ground point, a roll center (instantaneous center of roll) of the vehicle body which is given by the suspension stroke at the time of a turning (cornering) of the vehicle tends to become high so that a jacking (jack-up phenomenon of vehicle body) occurs during the turning of the vehicle. Thereby, a turning drivability (i.e., manipulation stability) of the vehicle tends to be damaged. However, in this embodiment, clearly from FIG. 2 showing a part of the suspension apparatus related to left front wheel, axle-member-side attaching point 4b of second lower link member 4 is located at a more upward position than vehicle-body-side attaching point 4a. Accordingly, the roll center of the vehicle body which is caused by the suspension stroke at the time of turning of the vehicle can be prevented from being made high as mentioned above. As a result, the above-mentioned problem that the jacking (jack-up phenomenon) of vehicle body becomes easy to occur during the turning of the vehicle so that the turning drivability of the vehicle tends to be damaged can be avoided.

Moreover as shown in FIG. 3, in this embodiment, axle-member-side attaching point 5b of third lower link member 5 is located in a more frontward position than axle-member-side attaching points 3b and 4b of first and second lower link members 3 and 4. Accordingly, rod 9 functioning as a knuckle arm of axle member 1L or 1R is made long. Hence, the length of the knuckle arm constituting a main part of a steering system can become relatively long so as to enhance a steering stiffness.

Moreover as shown in FIG. 2, in this embodiment; two vehicle-body-side attaching points 2a and 2b of upper arm member 2 are located in a more downward position than axle-member-side attaching point 2c of upper arm member 2, and vehicle-body-side attaching point 2a which is forward one of two vehicle-body-side attaching points 2a and 2b is located at a more upward position than vehicle-body-side attaching point 2b which is rearward one of vehicle-body-side attaching points 2a and 2b. Accordingly, the above-mentioned anti-dive angle can be enlarged so that the nose dive phenomenon during the braking of the vehicle can be further efficiently suppressed. Accordingly, the pitching behavior can be further suppressed at the time of braking of the vehicle.

This application is based on a prior Japanese Patent Application No. 2007-194970 filed on Jul. 26, 2007. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A front suspension apparatus for a vehicle, comprising:
a plurality of links suspending an axle member from a vehicle body to allow the axle member to move in a vertical direction of the vehicle, the axle member including a shaft portion rotatably supporting a front wheel, the plurality of links extending inwardly in a vehicle-width direction from the axle member, the plurality of links including:
an upper arm member extending from a position above the shaft portion of the axle member to the vehicle body, and
first and second lower link members each extending from a position below the shaft portion of the axle member to the vehicle body, the first and second lower link members being arranged:
to dispose the second lower link member at a more rearward position than the first lower link member,
to cause an imaginary straight line connecting a vehicle-body-side attaching point of the second lower link member with an axle-member-side attaching point of the second lower link member to have a smaller angle than that of an imaginary straight line connecting a vehicle-body-side attaching point of the first lower link member with an axle-member-side attaching point of the first lower link member relative to an imaginary straight line extending right in the vehicle-width direction, as viewed from above of the vehicle,
to cause the imaginary straight line of the second lower link member to overlap with the shaft portion of the axle member, as viewed from above of the vehicle,
to locate the axle-member-side attaching point of the second lower link member more downwardly than the axle-member-side attaching point of the first lower link member, and
to locate the axle-member-side attaching point of the first lower link member more inwardly in the vehicle-width direction than the axle-member-side attaching point of the second lower link member,
wherein the vehicle-body-side attaching point of the first lower link member is located at a more downward position than the axle-member-side attaching point of the first lower link member.

2. The front suspension apparatus as claimed in claim 1, wherein the axle-member-side attaching point of the first lower link member is nearer to the axle-member-side attaching point of the second lower link member than to any other attaching point of the plurality of links.

3. The front suspension apparatus as claimed in claim 1, wherein the vehicle-body-side attaching point of the first lower link member is located at a more upward position than the axle-member-side attaching point of the second lower link member.

4. The front suspension apparatus as claimed in claim 1, wherein the axle-member-side attaching point of the second lower link member is located at a more upward position than the vehicle-body-side attaching point of the second lower link member.

5. A front suspension apparatus for a vehicle, comprising:
a plurality of links suspending an axle member from a vehicle body to allow the axle member to move in a vertical direction of the vehicle, the axle member including a shaft portion rotatably supporting a front wheel, the plurality of links extending inwardly in a vehicle-width direction from the axle member,
the plurality of links including:
an upper arm member extending from a position above the shaft portion of the axle member to the vehicle body, and
first and second lower link members each extending from a position below the shaft portion of the axle member to the vehicle body, the first and second lower link members being arranged:
to dispose the second lower link member at a more rearward position than the first lower link member,
to cause an imaginary straight line connecting a vehicle-body-side attaching point of the second lower link member with an axle-member-side attaching point of the second lower link member to have a smaller angle than that of an imaginary straight line connecting a vehicle-body-side attaching point of the first lower link member with an axle-member-side attaching point of the first lower link member relative to an imaginary straight line extending right in the vehicle-width direction, as viewed from above of the vehicle,
to cause the imaginary straight line of the second lower link member to overlap with the shaft portion of the axle member, as viewed from above of the vehicle,
to locate the axle-member-side attaching point of the second lower link member more downwardly than the axle-member-side attaching point of the first lower link member, and
to locate the axle-member-side attaching point of the first lower link member more inwardly in the vehicle-width direction than the axle-member-side attaching point of the second lower link member,
wherein the upper arm member includes at least two vehicle-body-side attaching points and one axle-member-side attaching point, the two vehicle-body-side attaching points including a frontward attaching point and a rearward attaching point,
wherein the axle-member-side attaching point of the upper arm member is located at a more upward position than the two vehicle-body-side attaching points of the upper arm member, and
wherein the frontward attaching point of the two vehicle-body-side attaching points is located at a more upward position than the rearward attaching point of the two vehicle-body-side attaching points.

6. The front suspension apparatus as claimed in claim 1, wherein the second lower link member is arranged to cause the imaginary straight line of the second lower link member to overlap with the shaft portion of the axle member also as viewed from front of the vehicle.

7. The front suspension apparatus as claimed in claim 1, wherein the second lower link member is arranged to locate the imaginary straight line of the second lower link member substantially at the same position as an axis of the shaft portion of the axle member.

8. A front suspension apparatus for a vehicle, comprising:
means for suspending an axle member from a vehicle body to allow the axle member to move in a vertical direction of the vehicle, the axle member including a shaft portion rotatably supporting a front wheel, the means extending inwardly in a vehicle-width direction from the axle member,
the means including:
upper link means extending from a position above the shaft portion of the axle member to the vehicle body, and
first and second lower link means each extending from a position below the shaft portion of the axle member to the vehicle body, the first and second lower link means being arranged:
to dispose the second lower link means at a more rearward position than the first lower link means,
to cause an imaginary straight line connecting a vehicle-body-side attaching point of the second lower link means with an axle-member-side attaching point of the second lower link means to have a smaller angle than that of an imaginary straight line connecting a vehicle-body-side attaching point of the first lower link means with an axle-member-side attaching point of the first lower link means relative to an imaginary straight line extending right in the vehicle-width direction, as viewed from above of the vehicle, to cause the imaginary straight line of the second lower link means to overlap with the shaft portion of the axle member, as viewed from above of the vehicle, to locate the axle-member-side attaching point of the second lower link means more downwardly than the axle-member-side attaching point of the first lower link means, and to locate the axle-member-side attaching point of the first lower link means more inwardly in the vehicle-width direction than the axle-member-side attaching point of the second lower link means.

* * * * *